(12) United States Patent
Park et al.

(10) Patent No.: US 11,882,393 B2
(45) Date of Patent: Jan. 23, 2024

(54) MICROPHONE STRUCTURE AND ELECTRONIC DEVICE INCLUDING THE SAME

(71) Applicant: Samsung Electronics Co., Ltd., Gyeonggi-do (KR)

(72) Inventors: Seonguk Park, Gyeonggi-do (KR); Taeuk Kang, Gyeonggi-do (KR); Juhwan Kim, Gyeonggi-do (KR); Jiwoo Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 37 days.

(21) Appl. No.: 17/838,970

(22) Filed: Jun. 13, 2022

(65) Prior Publication Data
US 2022/0408170 A1 Dec. 22, 2022

Related U.S. Application Data

(63) Continuation of application No. PCT/KR2022/007724, filed on May 31, 2022.

(30) Foreign Application Priority Data

Jun. 17, 2021 (KR) ........................ 10-2021-0078732

(51) Int. Cl.
| | | |
|---|---|---|
| *H04R 1/04* | (2006.01) | |
| *H04R 1/28* | (2006.01) | |
| *H04R 3/00* | (2006.01) | |
| *H04R 1/08* | (2006.01) | |
| *H04N 23/51* | (2023.01) | |
| *H04M 1/02* | (2006.01) | |

(52) U.S. Cl.
CPC ............... *H04R 1/04* (2013.01); *H04N 23/51* (2023.01); *H04R 1/08* (2013.01); *H04R 1/2876* (2013.01); *H04R 3/00* (2013.01); *H04M 1/0277* (2013.01); *H04R 2499/11* (2013.01)

(58) Field of Classification Search
CPC .......... H04R 1/04; H04R 1/08; H04R 1/2876; H04R 3/00; H04R 2499/11; H04R 1/2853; H04M 1/0277; H04M 1/035; H04N 23/51
See application file for complete search history.

(56) References Cited

U.S. PATENT DOCUMENTS

| | | |
|---|---|---|
| 10,548,249 B2 | 1/2020 | Mokler et al. |
| 11,317,512 B2 | 4/2022 | Ha et al. |
| 11,601,539 B2 | 3/2023 | Choi et al. |
| 2011/0013787 A1 | 1/2011 | Chang |
| 2021/0144242 A1* | 5/2021 | Choi ........................ H04M 1/03 |

FOREIGN PATENT DOCUMENTS

KR 10-2016-0081450 7/2016

* cited by examiner

*Primary Examiner* — Tuan D Nguyen
(74) *Attorney, Agent, or Firm* — The Farrell Law Firm, P.C.

(57) ABSTRACT

Disclosed is an electronic device including a structure that stably supports a flexible printed circuit board on which a microphone module is disposed inside the electronic device, thereby improving the sealing between the microphone module and the camera housing.

20 Claims, 12 Drawing Sheets

MICROPHONE STRUCTURE AND ELECTRONIC DEVICE INCLUDING THE SAME

PRIORITY

This application is a Bypass Continuation Application of International Application No. PCT/KR2022/007724, which was filed on May 31, 2022, and is based on and claims priority under 35 U.S.C. § 119 to Korean Patent Application No. 10-2021-0078732, which was filed in the Korean Intellectual Property Office on Jun. 17, 2021, the entire disclosure of each of which is incorporated herein by reference.

BACKGROUND

1. Field

The disclosure relates generally to an electronic device, and more particularly, to a microphone structure and an electronic device including the microphone structure.

2. Description of Related Art

Various microphone modules for receiving an external sound may be disposed in an electronic device. Among the microphone modules, there may be a microphone module for receiving a sound in a direction coinciding with the photographing direction of a camera module. Such a microphone module may be disposed adjacent to the camera module and may be connected to a main printed circuit board (PCB) of the electronic device through a flexible printed circuit board (FPCB). For example, the flexible FPCB and the main PCB may be electrically connected through a conductive connection member.

A channel structure for transmitting an external sound to the microphone module may be formed inside the electronic device. A soundproof member for transmitting an external sound to the microphone module without leaking inside the electronic device may be disposed in the channel structure.

A microphone module for receiving a sound in a direction coinciding with the photographing direction of the camera module may be disposed at a position adjacent to the camera module. A camera housing that covers the microphone module and the camera module and having at least a part constituting the external appearance of the electronic device may be disposed in the electronic device. An external hole through which an external sound outside the electronic device is received may be formed in the camera housing. A soundproof member may be disposed between the camera housing and the microphone module so that the sound collected through the external hole can be transmitted to the microphone module.

The microphone module may be disposed on the FPCB so as to be electrically connected to the main PCB. A conductive connection member may be disposed between the FPCB and the main PCB, so that the FPCB and the main PCB may be electrically connected together. In addition to electrically connecting the FPCB and the main PCB, the connection member may serve to support the FPCB with respect to the main PCB. If the connection member supports only a part of the FPCB, the other part that is not supported may sag in a direction of gravity due to the weight of the microphone module. Hence, the sealing between the camera housing and the microphone module may be not properly achieved.

As such, there is a need in the art for an improved microphone module sealing structure in which the entirety of the connection member supports the FPCB.

SUMMARY

The disclosure has been made to address at least the above-mentioned problems and/or disadvantages and to provide at least the advantages described below.

Accordingly, an aspect of the disclosure is to provide a structure that stably supports the FPCB on which the microphone module is disposed inside the electronic device, thereby improving the sealing between the microphone module and the camera housing.

In accordance with an aspect of the disclosure, an electronic device including a first printed circuit board (PCB), a second PCB that is disposed to be spaced apart in a first direction from the first PCB and includes a first sound hole, a microphone module that is disposed on a first surface of the second PCB facing the first PCB so as to connect a microphone hole and receive an external sound through the first sound hole, a plurality of connection members that are disposed between the first PCB and the second PCB to electrically connect the first PCB and the second PCB and are arranged at different positions with respect to the microphone module, a cover member that includes a second sound hole, which is formed to be connected to the first sound hole and to open into an outside of the electronic device, and is disposed in the first direction with respect to the second PCB, and a sound channel that is located between the cover member and the second PCB, the sound channel being configured to connect the first sound hole and the second sound hole.

In accordance with an aspect of the disclosure, a microphone structure may include a microphone module in a second PCB that is disposed to be spaced apart in a first direction from a first PCB of an electronic device, the microphone module being disposed on a first surface of the second PCB facing the first PCB, a plurality of connection members that are disposed between the first PCB and the second PCB to electrically connect the first PCB and the second PCB and are arranged at different positions with respect to the microphone module, a first sound hole that is formed in the second PCB to be connected to a microphone hole of the microphone module, a second sound hole that is formed to be connected to the first sound hole in a cover member disposed in the first direction with respect to the second PCB, and to open into an outside of the electronic device, and a sound channel that is located between the cover member and the second PCB, the sound channel being configured to connect the first sound hole and the second sound hole.

BRIEF DESCRIPTION OF THE DRAWINGS

The above and other aspects, features, and advantages of certain embodiments of the disclosure will be more apparent from the following detailed description taken in conjunction with the accompanying drawings, in which.

DETAILED DESCRIPTION

Figure 1:
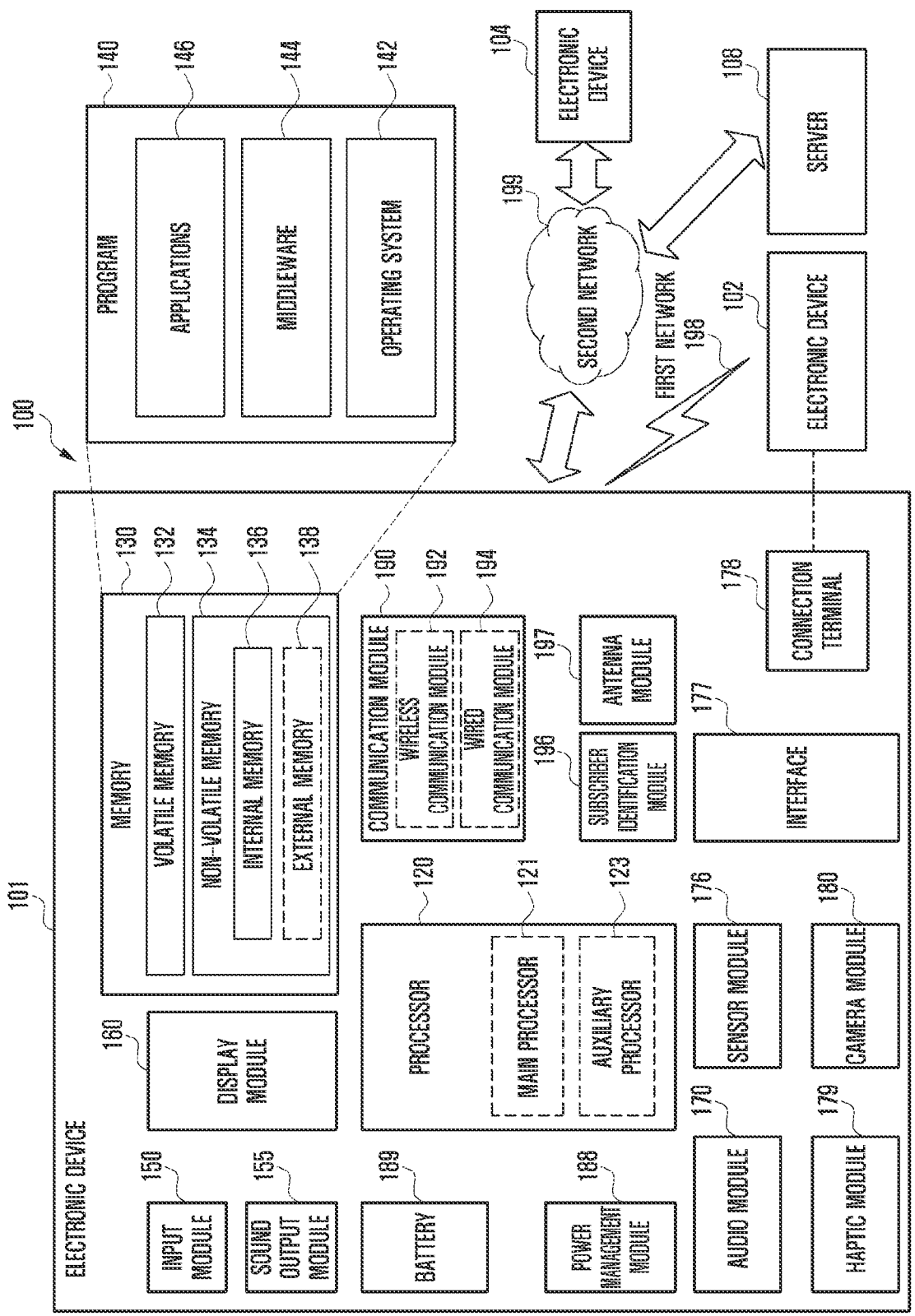
FIG. 1 is a block diagram of an electronic device in a network environment according to an embodiment.

Hereinafter, embodiments of the disclosure will be described in detail with reference to the accompanying drawings. Descriptions of well-known functions and/or configurations will be omitted for the sake of clarity and conciseness.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) card 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., the PCB (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a PCB, a RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. Alternatively, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
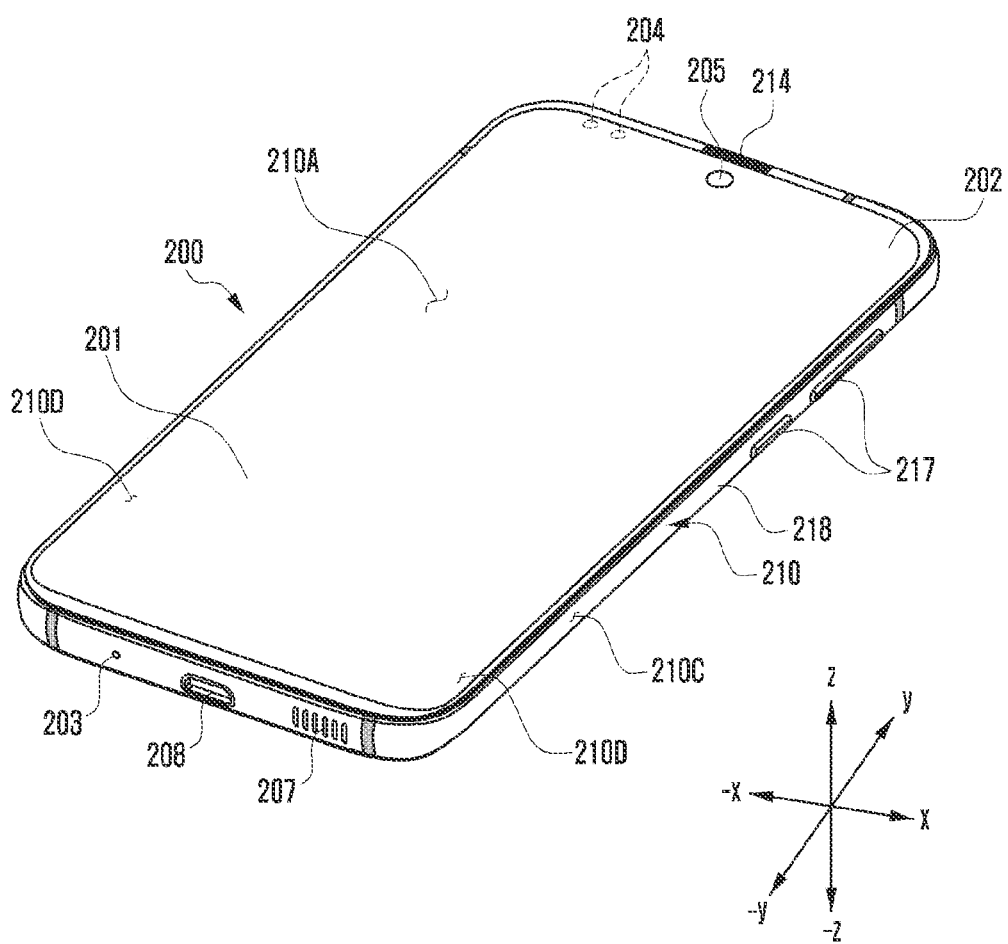
FIG. 2A is a front perspective view of an electronic device according to an embodiment.
Figure 2B:
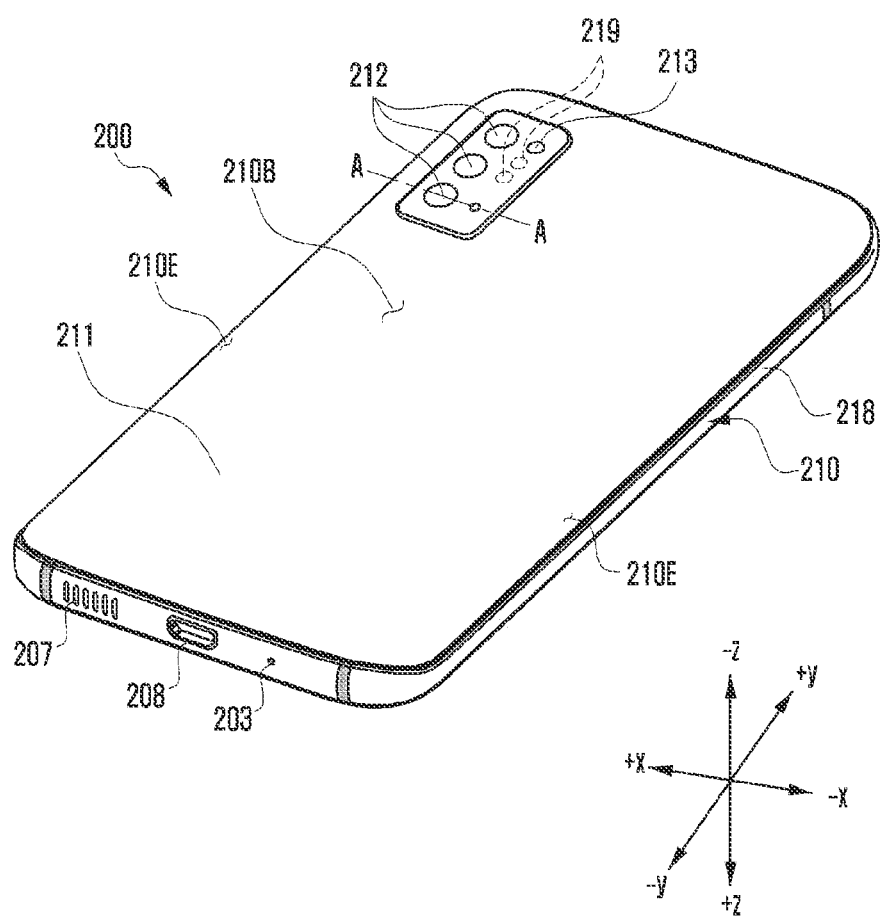
FIG. 2B is a rear perspective view of the electronic device of FIG. 2A according to an embodiment.

FIG. 2A is a front perspective view of an electronic device according to an embodiment. FIG. 2B is a rear perspective view of the electronic device of FIG. 2A according to an embodiment.

The electronic device 200 to be described below may include at least one of the components of the electronic device 101 described above with reference to FIG. 1.

With reference to FIG. 2A and FIG. 2B, the electronic device 200 may include a housing 210 that includes a first surface (or front surface) 210A, a second surface (or rear surface) 210B, and a side surface 210C surrounding a space between the first surface 210A and the second surface 210B. Alternatively, the housing 210 may refer to a structure forming a part of the first surface 210A, the second surface 210B, and the side surface 210C in FIG. 2A. The first surface 210A may be formed by a front plate 202 (e.g., glass plate or polymer plate including various coating layers) having at least a portion that is substantially transparent. The second surface 210B may be formed by a rear plate 211 that is substantially opaque. The rear plate 211 may be formed by coated or tinted glass, ceramic, polymer, metal (e.g., aluminum, stainless steel (STS), or magnesium), or a combination of at least two thereof. The side surface 210C may be formed by a side bezel structure (or "side member") 218 coupled to the front plate 202 and the rear plate 211 and including a metal and/or a polymer. The rear plate 211 and side bezel structure 218 may be integrally formed and include the same material (e.g., metal material such as aluminum).

The front plate 202 may include a first region 210D that is curved and seamlessly extended from the first surface 210A toward the rear plate at opposite ends of the longer edge of the front plate 202. In FIG. 2B, the rear plate 211 may include a second region 210E that is curved and seamlessly extended from the second surface 210B toward the front plate 202 respectively at opposite ends of the longer edge. The front plate 202 or the rear plate 211 may include only one of the first region 210D and the second region 210E. The front plate 202 may not include the first region and the second region but may include only a flat surface disposed parallel to the second surface 210B. When the electronic device is viewed from the side thereof, the side bezel structure 218 may have a first thickness (or width) on a side where the first region 210D or the second region 210E is not included, and may have a second thickness than the first thickness on a side where the first region 210D or the second region 210E is included.

The electronic device 200 may include at least one or more of a display 201, input device 203, sound output devices 207 and 214, sensor modules 204 and 219, camera modules 205 and 212, key input device 217, indicator, and a connector 208. At least one of the elements (e.g., key input device 217 or indicator) may be omitted from the electronic device 200, or another element may be added to the electronic device 200.

The display 201 may be exposed through a significant portion of the front plate 202. At least a portion of the display 201 may be exposed through the front plate 202 forming the first surface 210A and the first region 210D of the side surface 210C. The display 201 may be coupled to or disposed adjacent to a touch sensing circuit, a pressure sensor capable of measuring the intensity (pressure) of a touch, and/or a digitizer that detects a magnetic field type stylus pen. At least some of the sensor modules 204 and 219, and/or at least some of the key input devices 217 may be disposed on the first region 210D and/or the second region 210E.

The input device 203 may include a microphone 203 or a plurality of microphones 203 arranged to detect the direction of a sound. The sound output devices 207 and 214 may include speakers 207 and 214. The speakers 207 and 214 may include an external speaker 207 and a call receiver 214. The microphone 203, the speakers 207 and 214, and the connector 208 may be at least partially disposed in the internal space of the electronic device 200 and may be exposed to the external environment through at least one hole formed in the housing 210. The hole formed in the housing 210 may be commonly used for the microphone 203 and the speakers 207 and 214. The sound output devices 207 and 214 may include a speaker (e.g., piezo speaker) that operates in isolation from the hole formed in the housing 210.

The sensor modules 204 and 219 may generate an electrical signal or a data value corresponding to an internal operating state of the electronic device 200 or an external environmental state. The sensor modules 204 and 219 may include a first sensor module 204 (e.g., proximity sensor) and/or a second sensor module (e.g., fingerprint sensor) disposed on the first surface 210A of the housing 210, and/or a third sensor module 219 (e.g., heart rate monitor (HRM) sensor) disposed on the second surface 210B of the housing 210. The fingerprint sensor may be disposed on the first surface 210A (e.g., home key button) of the housing 210, on a portion of the second surface 210B, and/or under the display 201. The electronic device 200 may further include a sensor module at least one of a gesture sensor, a gyro sensor, a barometric pressure sensor, a magnetic sensor, an acceleration sensor, a grip sensor, a color sensor, an IR sensor, a biometric sensor, a temperature sensor, a humidity sensor, a proximity sensor, or an illuminance sensor.

The camera modules 205 and 212 may include a first camera module 205 disposed on the first surface 210A of the electronic device 200, a second camera module 212 disposed on the second surface 210B, and/or a flash 213. The camera modules 205 and 212 may include one or plural lenses, an image sensor, and/or an image signal processor. The flash 213 may include a light emitting diode (LED) or a xenon lamp. Two or more lenses (wide-angle lens, ultra-wide-angle lens, or telephoto lens) and image sensors may be arranged in one surface of the electronic device 200.

The key input devices 217 may be arranged in the side surface 210C of the housing 210. Alternatively, the electronic device 200 may not include some or all of the above-mentioned key input devices 217, and a key input device 217 not included may be implemented on the display 201 in a different form such as a soft key. Alternatively, the key input devices 217 may be implemented using a pressure sensor included in the display 201.

The indicator may be disposed on the first surface 210A of the housing 210. The indicator may provide state information of the electronic device 200 in a light form (e.g., light emitting element). Alternatively, the light emitting element may provide a light source interacting with the operation of the camera module 205. The indicator may include the LED, an IR LED, and/or a xenon lamp.

The connector holes 208 may include a first connector hole 208 capable of accepting a connector (e.g., a USB connector) for transmitting and receiving power and/or data to and from an external electronic device, and/or a second connector hole (e.g., earphone jack) capable of accepting a connector for transmitting and receiving an audio signal to and from an external electronic device.

Some of the camera modules 205 and 212, the sensor modules 204 and 219, or the indicator may be disposed to be exposed through the display 201. For example, the camera module 205, the sensor module 204, or the indicator may be arranged in the internal space of the electronic device 200 so as to be in contact with the external environment through an opening of the display 201 perforated up to the front plate 202 or a transmissive region. The region in which the display 201 and the camera module 205 face each other may be formed as a transmissive region having a preset transmittance as a part of the content display area. The transmissive region may be formed to have a transmittance in a range of about 5 percent to about 20 percent. This transmissive region may include a region overlapping an effective area (e.g., angle-of-view area) of the camera module 205 through which light passes for image generation with an image formed by an image sensor. For example, the transmissive region of the display 201 may include a region having a lower pixel density than surrounding regions. The transmissive region may replace the opening. For example, the camera module 205 may include an under display camera (UDC). Alternatively, a certain sensor module 204 may be disposed in the internal space of the electronic device so as to perform its function without being visually exposed through the front plate 202. In this case, the region of the display 201 facing the sensor module may not need a perforated opening.

Although the electronic device 200 has a bar-type or plate-type appearance, the disclosure is not limited thereto. For example, the electronic device 200 may be a part of a foldable electronic device, a slidable electronic device, a stretchable electronic device, and/or a rollable electronic device, which indicate an electronic device having a display that can be deformed by bending so that at least a portion of the display may be folded, wound or rolled, at least partially expanded in area, and/or accommodated inside the housing. A foldable electronic device, a slidable electronic device, a stretchable electronic device, and/or a rollable electronic device can be used with an extended screen display area by unfolding the display or exposing a larger area of the display to the outside according to the needs of the user.

Figure 3:
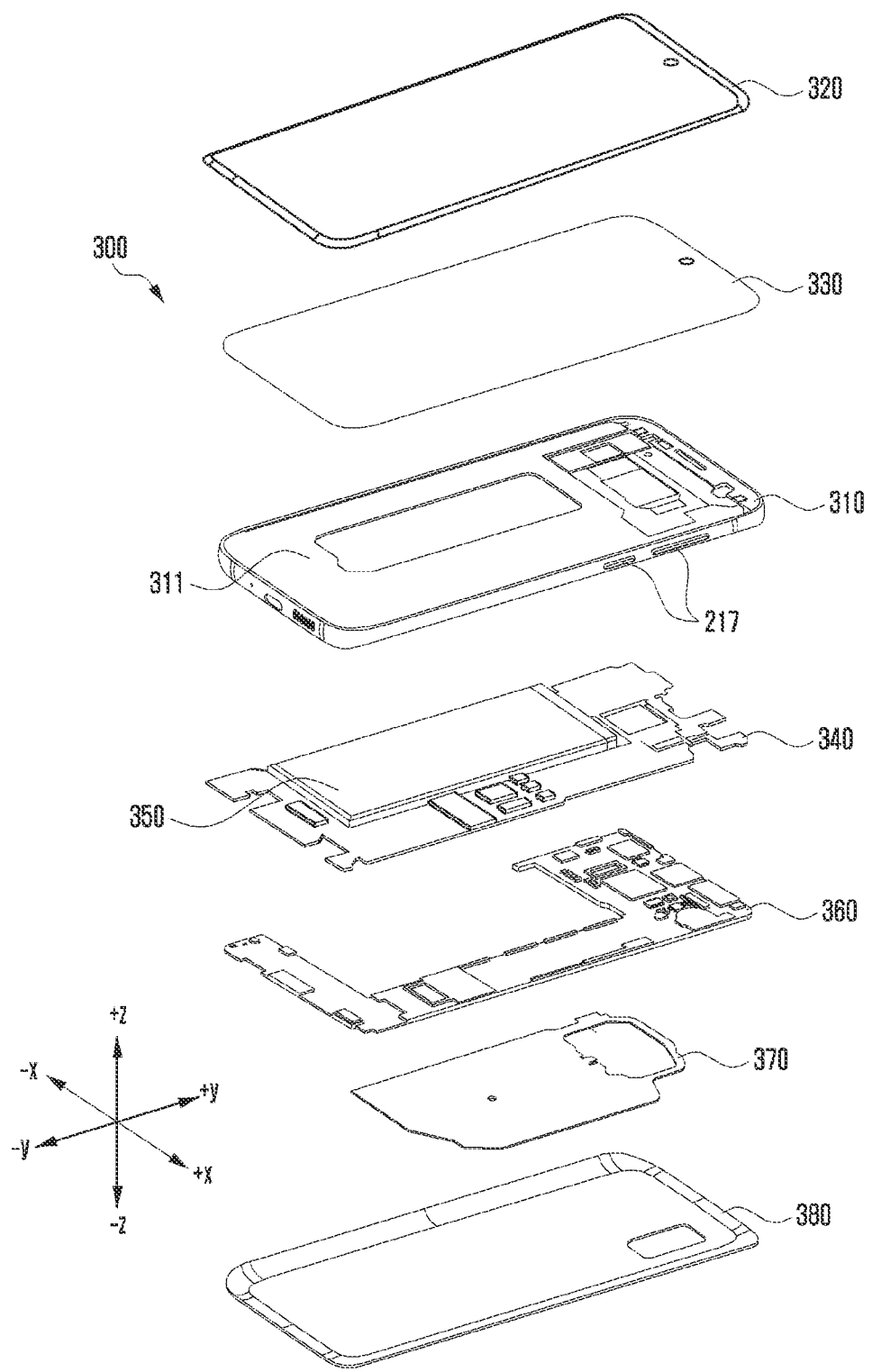
FIG. 3 is an exploded perspective view of the electronic device of FIG. 2A according to an embodiment.

FIG. 3 is an exploded perspective view of the electronic device of FIG. 2A according to an embodiment.

The electronic device 300 of FIG. 3 may be at least partially similar to the electronic device 200 of FIGS. 2A and 2B, or may include other embodiments of an electronic device.

With reference to FIG. 3, the electronic device 300 may include a side member 310 (e.g., side bezel structure), a first support member 311 (e.g., bracket or support structure), a front plate 320 (e.g., front cover), a display 330, a PCB, an FPCB, or rigid-flexible PCB (RFPCB) 340, a battery 350, a second support member 360 (e.g., rear case), an antenna 370, and a rear plate 380 (e.g., rear cover). At least one of the components (e.g., first support member 311 or second support member 360) may be omitted from the electronic device 300 or other components may be additionally included therein. At least one of the components of the electronic device 300 may be the same as or similar to at least one of the components of the electronic device 200 of FIG. 2A or 2B, and repeated descriptions will be omitted below.

The first support member 311 may be disposed inside the electronic device 300 and may be connected to the side member 310 or may be integrally formed with the side member 310. The first support member 311 may be made of a metal material and/or a non-metal (e.g., polymer) material. The first support member 311 may have one surface coupled to the display 330 and the other surface coupled to the PCB 340. A processor, a memory, and/or an interface may be mounted on the PCB 340. The processor may include one or more of a central processing unit, an application processor, a graphics processing unit, an image signal processor, a sensor hub processor, and a communication processor.

The memory may include a volatile memory or a nonvolatile memory.

The interface may include an HDMI, a USB interface, an SD card interface, and/or an audio interface. The interface may electrically or physically connect the electronic device 300 to an external electronic device, and may include a USB connector, an SD card/MMC connector, or an audio connector.

The battery 350 is a device for supplying power to at least one component of the electronic device 300 and may include a non-rechargeable primary cell, a rechargeable secondary cell, or a fuel cell. At least a portion of the battery 350 may be disposed substantially coplanar with the PCB 340, for example. The battery 350 may be integrally disposed inside the electronic device 300. Alternatively, the battery 350 may be attachable to and detachable from the electronic device 300.

The antenna 370 may be disposed between the rear plate 380 and the battery 350. The antenna 370 may include a near field communication (NFC) antenna, a wireless charging antenna, and/or a magnetic secure transmission (MST) antenna. The antenna 370 may perform short-range communication with an external device or wirelessly transmit and receive power required for charging. Alternatively, an antenna structure may be formed by a part of the side bezel structure 310 and/or the first support member 311 or a combination thereof.

Figure 4:
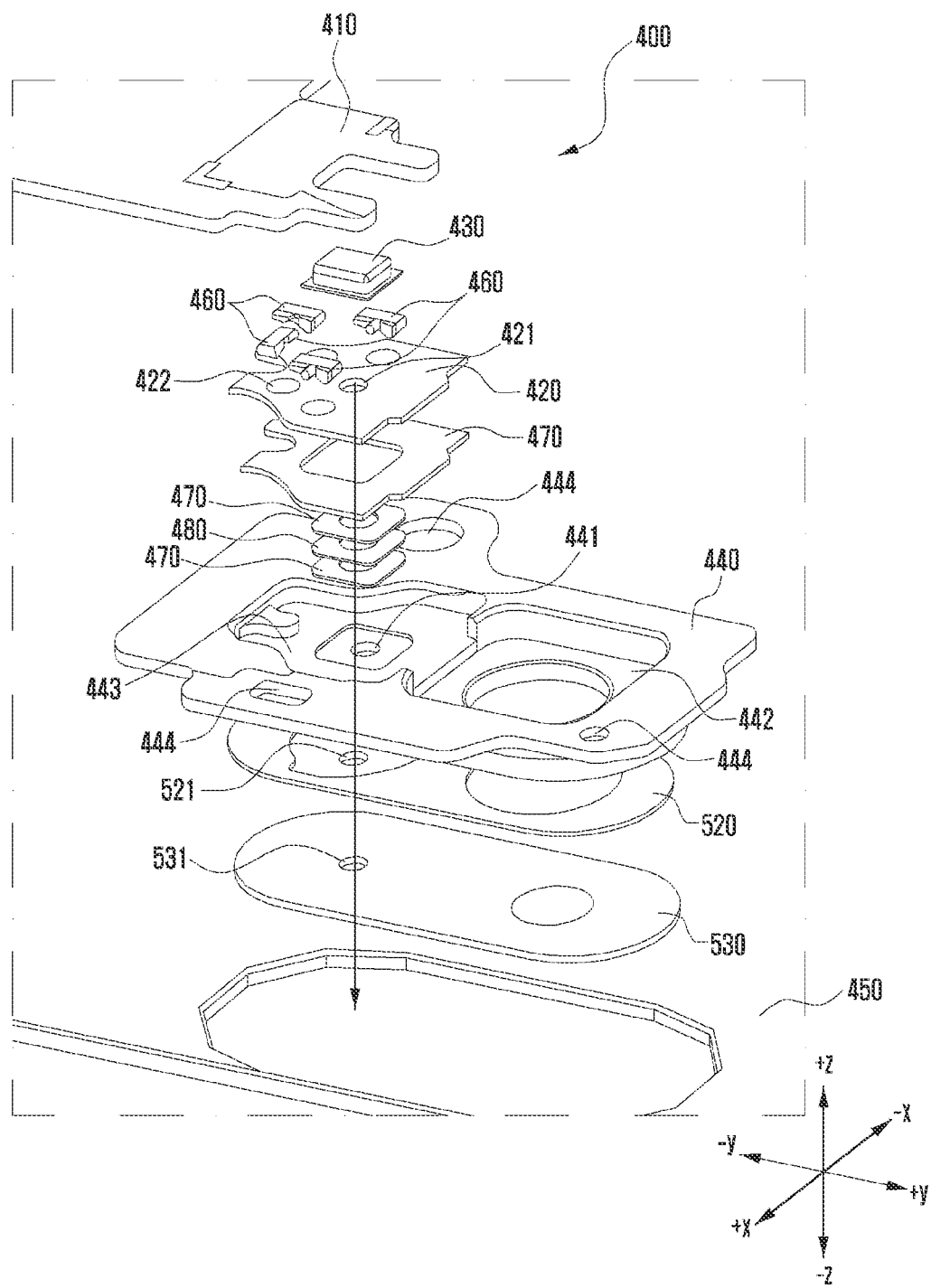
FIG. 4 is an exploded perspective view of a third microphone module and components forming a channel structure according to an embodiment.

FIG. 4 is an exploded perspective view of a third microphone module and components forming a channel structure according to an embodiment.

The electronic device 400 shown in FIG. 4 (e.g., electronic device 101 in FIG. 1, electronic device 200 in FIG. 2A, or electronic device 300 in FIG. 3) may be an embodiment of the electronic device 101, 200 or 300 described with reference to FIG. 1, 2 or 3. The electronic device 400 in FIG. 4 may include an electronic device 400 in the form of a tablet PC, as an electronic device 400 different from the electronic devices 101, 200 and 300 in FIGS. 1 to 3. As shown in FIG. 4, the electronic device 400 may include a third microphone module 430 disposed at a position adjacent to the rear camera module 212. Inside the housing 210, the third microphone module 430 may be stacked in the order of first PCB 410-third microphone module 430-second PCB 420-bracket 440-cover member 450.

The electronic device 400 may include a first PCB 410, a second PCB 420 disposed in a first direction (e.g., −Z direction in FIG. 4) with respect to the first PCB 410 and including the third microphone module 430, a connection member 460 disposed between the first PCB 410 and the second PCB 420 to electrically connect the first PCB 410 and the second PCB 420, a bracket 440 disposed in the first direction with respect to the second PCB 420 to fix the second PCB 420, a soundproof member 480 disposed between the bracket 440 and the second PCB 420, and the cover member 450 disposed in the first direction with respect to the bracket 440 and coupled to the bracket 440, which are arranged inside the housing 210. In addition to the above-described components, various electronic components may be disposed in the electronic device 400. At least one of the above-described components may be omitted from the electronic device 400 or at least one other component may be added thereto. For example, the bracket 440 shown in FIG. 4 may be omitted in one embodiment.

Hereinafter, the first direction being a direction from the first PCB 410 to the second PCB 420 will be defined to be a −Z direction with reference to FIG. 4 or FIG. 5.

As shown in FIG. 4, the first PCB 410 may be disposed inside the electronic device 400. The first PCB 410 indicates the PCB. At least one electronic component may be electrically connected to the first PCB 410.

The electronic component may be electrically connected directly to the first PCB 410. For example, the electronic component may be directly connected to the first PCB 410 through soldering. The electronic component may be disposed on the FPCB and be electrically connected to the first PCB 410. For example, an electronic component may be disposed on the second PCB 420. The second PCB 420 may be an FPCB. The electronic component may be electrically connected to the first PCB 410 as the second PCB 420 is electrically connected to the first PCB 410 through soldering or a separate connection member 460.

A plurality of microphone modules may be disposed inside the electronic device 400.

The plurality of microphone modules may recognize the voice of the user. In a call operation, at least one of plural speakers may be used to deliver a call sound of an incoming call to the user. In this case, the user's voice may be recognized by at least one of the plural microphone modules disposed in the electronic device 400 so that the user's voice is transmitted to the counterpart.

The plurality of microphone modules may include a first microphone module disposed at the upper end of the electronic device 400, a second microphone module disposed at the lower end of the electronic device 400, and a third microphone module 430 disposed at a position adjacent to the rear camera module 212 facing the rear surface of the electronic device 400. As described above, the plurality of microphone modules may be disposed in different regions inside the electronic device 400. As the physical distance between the plural microphone modules increases, the electronic device 400 may collect external sounds in a widening range.

The plural microphone modules may compare sound signals transmitted to them to perform noise cancellation. For example, during a call, each microphone module may primarily recognize the user's voice and remove other noises by analyzing collected sound information. Hence, a plurality of microphone modules may be disposed inside the electronic device 400 so as to distinguish between a sound to be collected and a sound corresponding to a reverberation.

Among the plural microphone modules, the third microphone module 430 may collect a sound generated from the outside during photographing. For example, the third microphone module 430 may be disposed adjacent to the rear camera module 212 to receive a sound in a direction coinciding with the photographing direction of the rear camera module 212.

As will be described later in detail herein, a hole may be formed in the housing 210 of the electronic device 400 to allow an external sound outside the electronic device 400 to be introduced to the plural microphone modules. The hole may be formed in at least one of the upper end of the housing 210 (e.g., +Y direction in FIG. 2A) or the lower end of the housing 210 (e.g., −Y direction in FIG. 2A). The hole may be connected to the plural microphone modules through a channel structure. An external sound of the electronic device 400 may be introduced through the hole and transmitted to the plural microphone modules.

As shown in FIG. 4, the bracket 440 may be disposed between the cover member 450 and the second PCB 420 in the first direction with respect to the rear camera module 212 and the second PCB 420. The bracket 440 may fix the second PCB 420 on which the third microphone module 430 is disposed, and the rear camera module 212. A first seating portion 442 on which the rear camera module 212 is mounted and a second seating portion 443 on which the second PCB 420 is disposed may be formed in the bracket 440.

In FIG. 4, the first seating portion 442 and the second seating portion 443 may be formed on the surface of the bracket 440 facing the second PCB 420 (e.g., surface facing in +Z direction in FIG. 4). The rear camera module 212 may be disposed on the first seating portion 442, and the second PCB 420 may be disposed on the second seating portion 443, in order to affix the rear camera module 212 and second PCB 420 to the bracket 440.

The bracket 440 may be fixed in various manners inside the electronic device 400. For example, a fixing hole 444 through which a fixing member passes may be formed in the bracket 440 and the housing 210. The bracket 440 may be fixed to the housing 210 through the fixing member passing through the fixing hole 444 formed in the bracket 440 and the fixing hole 444 formed in the housing 210. The bracket 440 may also be fixed to the housing 210 in various manners, such as through an adhesive member 470 (e.g., bond or tape) or bolt coupling.

The cover member 450 covering the rear camera module 212 may be disposed in the electronic device 400. At least a part of the cover member 450 may constitute an external appearance of the electronic device 400. The cover member 450 may be disposed in the first direction with respect to the bracket 440.

The structure of the disclosure to be described below is not limited only to the third microphone module 430. In some cases, the structure of the disclosure may be applied to a plurality of microphone modules arranged in the electronic device 400. The disclosure is not limited only to the microphone module. The present invention can be applied to any structure where the second PCB 420 on which specific electronic components are disposed is supported by the first PCB 410 through a conductive connection member 460. The following description will focus on the third microphone module 430 for convenience of description.

Figure 5:
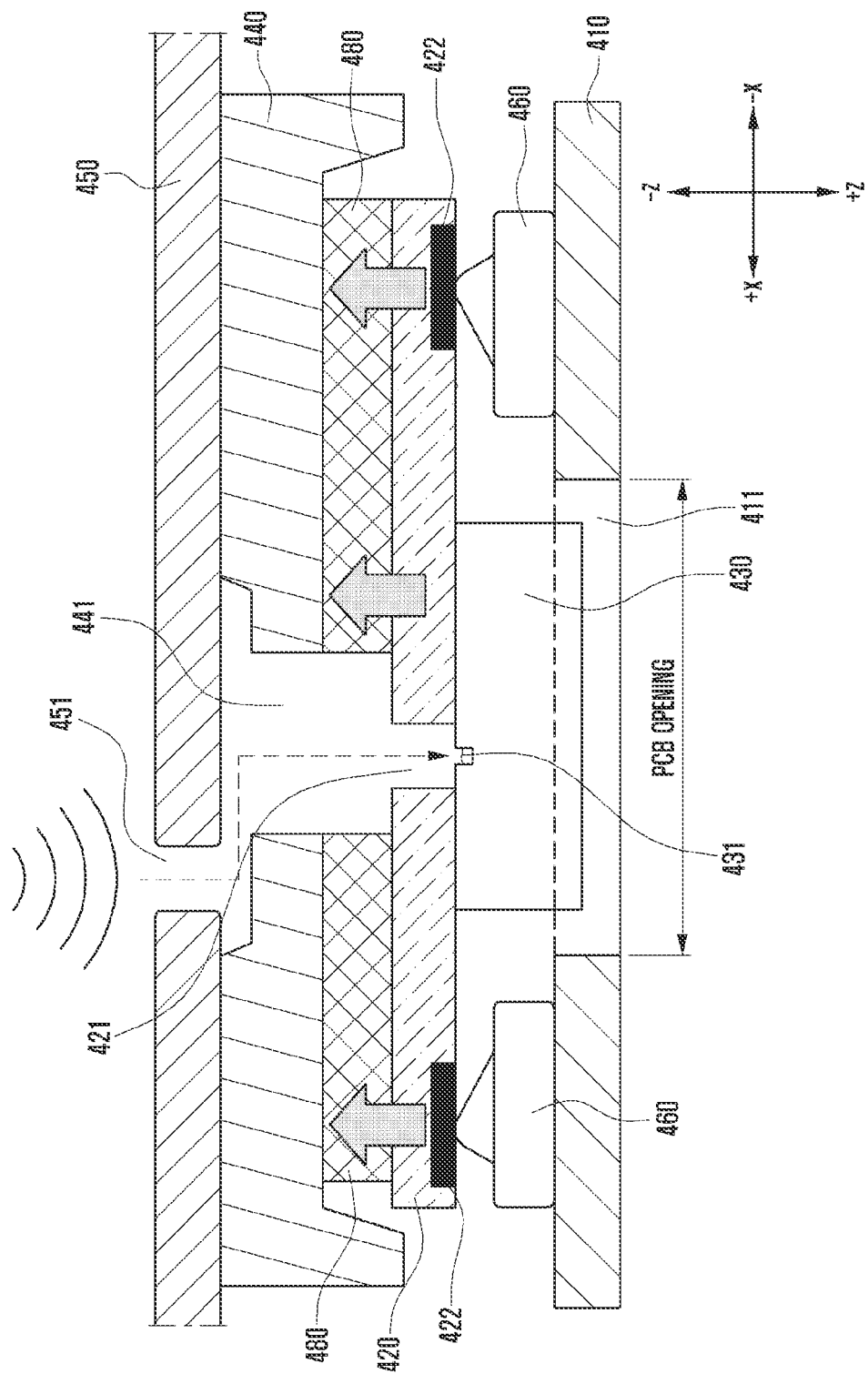
FIG. 5 is an enlarged cross-sectional view of a part of the electronic device taken along line A-A in FIG. 2B.
Figure 6:
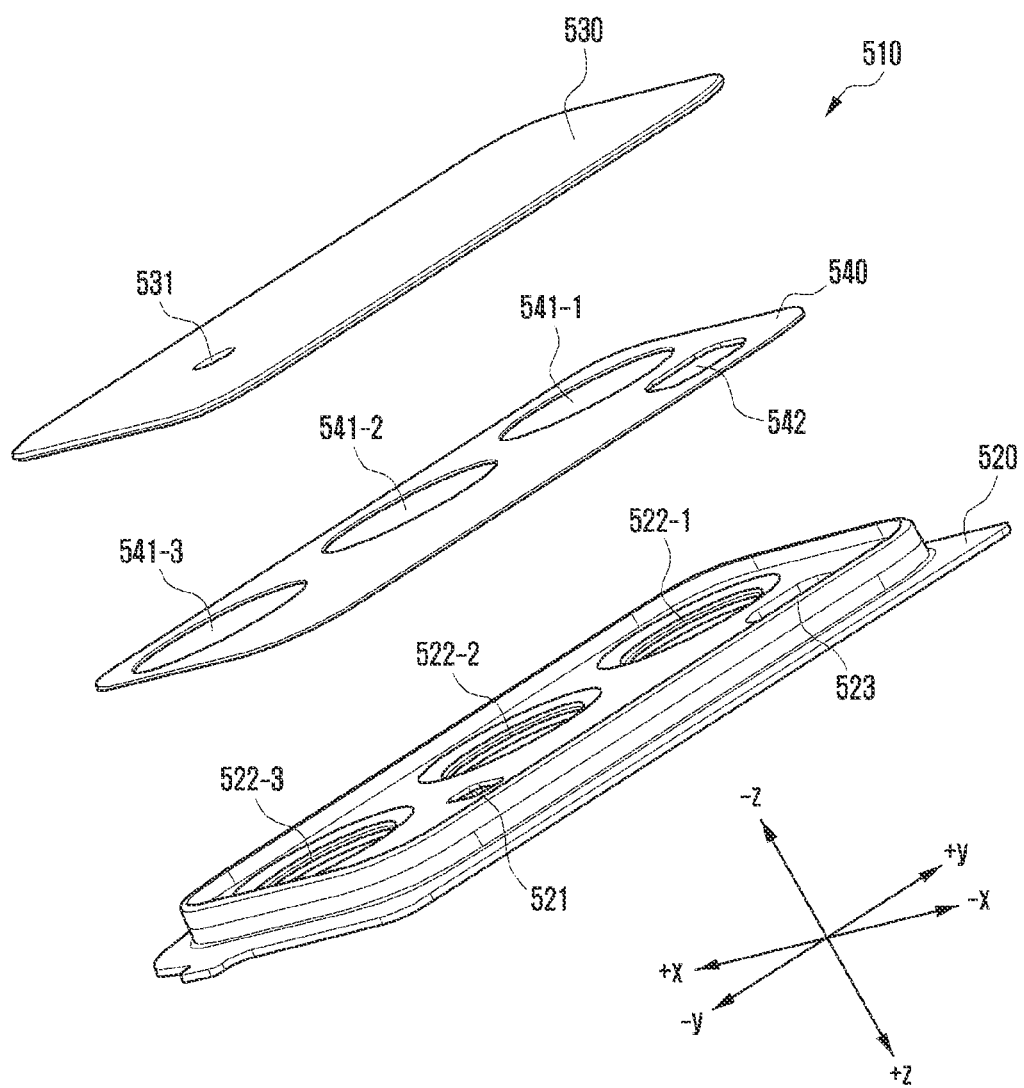
FIG. 6 is an exploded perspective view of a camera housing according to an embodiment.

FIG. 5 is an enlarged cross-sectional view of a part of the electronic device taken along line A-A in FIG. 2B. FIG. 6 is an exploded perspective view of a camera housing according to an embodiment.

As shown in FIG. 5, the electronic device 400 may have a stacked structure for the third microphone module to collect an external sound. The first PCB, the third microphone module 430, the second PCB 420, the bracket 440, and the cover member 450 (e.g., rear cover 380 in FIG. 3) are stacked in that order, so that an external sound of the electronic device 400 may be collected. The first PCB 410, the third microphone module 430, the second PCB 420, and the cover member 450 may be stacked in that order, so that an external sound of the electronic device 400 can be collected.

The third microphone module 430 may be electrically connected to the first PCB 410. The third microphone module 430 may be directly connected to the first PCB 410 through soldering. Alternatively, the third microphone module 430 may be disposed on the FPCB and may be electrically connected to the first PCB 410. For example, the third microphone module 430 may be disposed on the second PCB 420. The second PCB 420 may be an FPCB. The third microphone module 430 may be electrically connected to the first PCB 410 as the second PCB 420 is electrically connected to the first PCB 410.

In FIG. 5, the third microphone module 430 may be disposed on a first surface of the second PCB 420 so that the microphone hole 431 faces the first surface of the second PCB 420 (e.g., surface facing in +Z direction). A first sound hole 421 connected to the microphone hole 431 of the third microphone module 430 may be formed in the second PCB 420. For example, the first sound hole 421 may be formed in the second PCB 420 at a position facing the microphone hole 431 of the third microphone module 430. The first sound hole 421 may be connected to a second sound hole 451 formed in the cover member 450 to be described later herein. An external sound of the electronic device 400 introduced through the second sound hole 451 may be transmitted to the third microphone module 430 via the first sound hole 421 and the microphone hole 431.

In FIG. 5, a cover member 450, having at least a part that constitutes the external appearance of the electronic device 400, may be disposed in the electronic device 400. For example, the cover member 450 may be disposed in the first direction (e.g., −Z direction in FIG. 4 or FIG. 5) with respect to the rear camera module 212 and the second PCB 420.

The second sound hole 451 may be formed in the cover member 450 to enable an external sound of the electronic device 400 to be introduced. The second sound hole 451 may be connected to the first sound hole 421 connected to the microphone hole 431. A channel structure may be formed inside the electronic device 400 to connect from the second sound hole 451 to the first sound hole 421. The channel indicates a path for guiding a sound and may include a physical space. The channel may include a space filled with a medium for transmitting a sound. In the following description, the transmission of a sound through a channel indicates that the sound is transmitted via a specific space.

As will be described later, the second sound hole 451 and the microphone hole 431 of the third microphone module 430 may be connected through the sound channel 441. For example, a connection may be made in the order of second sound hole 451, sound channel 441, first sound hole 421, and microphone hole 431. The sound channel 441 may be directly formed in a mechanism disposed inside the electronic device 400. For example, as shown in FIG. 5, the sound channel 441 may be directly formed in the bracket 440 disposed between the cover member 450 and the second PCB 420. The sound channel 441 may refer to a space indirectly formed according to the arrangement of mechanisms disposed inside the electronic device 400. For example, the sound channel 441 may be formed by the soundproof member 480 disposed between the second sound hole 451 and the first sound hole 421.

An external sound of the electronic device 400 may be transmitted to the third microphone module 430 via the second sound hole 451, the sound channel 441, the first sound hole 421, and the microphone hole 431.

The cover member 450 may include the camera housing 510 disposed to cover the rear camera module 212. The camera housing 510 may refer to a mechanism disposed to cover the rear camera module 212 to protect the rear camera module 212. The rear camera module 212 may be electrically connected to at least one of the first PCB 410 or the second PCB 420.

Referring back to FIG. 4, and further in reference to FIG. 6, the camera housing 510 may be disposed in the first direction with respect to the rear camera module 212 so as to cover the rear camera module 212. A portion of the camera housing 510 may be formed to have a size that can fully cover to the rear camera module 212 adjacent to the third microphone module 430. The camera housing 510 may include a body part 520 and a window member 530. The body part 520 may constitute the overall shape of the camera housing 510. At least a portion of the window member 530 may be made of a material having a light-transmitting region. At least a portion of the window member 530 may be made of a transparent material so that external light may be incident on the lens of the rear camera module 212. The camera housing 510 may have a form in which the body part 520 and the window member 530 are combined. The camera housing 510 may have a structure in which the window member 530, the adhesive member 470, and the body part 520 are stacked in this order.

The second sound hole 451 may be formed in the camera housing 510. The second sound hole 451 may be a hole through which the outside and the inside of the electronic device 400 open into each other. An external sound may be transmitted to the inside of the electronic device 400 through the second sound hole 451. A sound collected in a direction coinciding with the photographing direction of the rear camera module 212 may be introduced into the second sound hole 451. As the camera housing 510 is disposed in the first direction with respect to the third microphone module 430, an external sound of the electronic device 400 may be transmitted to the third microphone module 430 in the order of the second sound hole 451, the sound channel 441, the first sound hole 421, and the microphone hole 431.

The second sound hole 451 may include an external hole 531 formed in the window member 530. In FIGS. 4, 5 and 6, the second sound hole 451 may include a first channel 521 formed at a position of the body part 520 corresponding to the external hole 531 formed in the window member 530. The second sound hole 451 may be a concept referring to when the external hole 531 formed in the window member 530 and the first channel 521 formed in the body part 520 are connected.

With reference to FIG. 6, the camera housing 510 may include a structure in which the body part 520, the adhesive layer 540, and the window member 530 are stacked in this order.

The body part 520 may be made of a metal and/or non-metal material having a specific strength or more to protect the rear camera module 212. A plurality of holes 522-1, 522-2 and 522-3, in which a plurality of lenses of the rear camera module 212 can be disposed, may be formed in the body part 520. The plural lenses of the rear camera module 212 may be disposed respectively in the plural holes 522-1, 522-2 and 522-3 to be fixed to the body part 520. A hole 523, in which at least one flash 213 interworking with the rear camera module 212 can be disposed, may be formed in the body 520. The first channel 521 connected to the external hole 531 formed in the window member 530 may be formed in the body part 520 so as to receive an external sound of the electronic device 400.

The adhesive layer 540 may be seated on the body part 520. For example, as shown in FIG. 6, the adhesive layer 540 may be disposed in the −Z direction with respect to the body part 520 in FIG. 6 to be seated on the body part 520. The adhesive layer 540 may be disposed between the body part 520 and the window member 530 to fix the window member 530 to the body part 520. The adhesive layer 540 may be made of a material having low light transmittance so that the body part 520 is not visible through the window member 530. A plurality of holes 541-1, 541-2 and 541-3 may be formed in the adhesive layer 540 in correspondence to the plurality of holes 522-1, 522-2 and 522-3 formed in the body part 520. A hole 542 may be formed in the adhesive layer 540 in correspondence to the hole 523 of the body part 520 in which the flash 213 is disposed.

The window member 530 may be fixed to the body part 520 through the adhesive layer 540. The external hole 531 connected to the first channel 521 formed in the body part 520 may be formed in the window member 530. The window member 530 may be made of a material having high light transmittance so that light can be transmitted to the camera lens of the rear camera module 212.

It has been described above that the external hole 531 and the first channel 521 are formed in the camera housing 510, but the external hole 531 and the first channel 521 may be formed in a component other than the camera housing 510. For example, the external hole 531 and the first channel 521 may be formed in the cover member 450. The cover member 450 may include various mechanisms disposed on the rear surface (e.g., surface facing in −Z direction in FIG. 3) of the electronic device 400. It may be understood that the camera housing 510 described above is also included in the cover member 450. Alternatively, the cover member 450 may include various mechanisms disposed on the front surface (e.g., surface facing in +Z direction in FIG. 3) of the electronic device 400. For example, when the third microphone module 430 is disposed adjacent to the front surface (e.g., in +Z direction in FIG. 3) of the electronic device 400, the cover member 450 may include the front plate 202 or the display 201.

As shown in FIG. 5, the bracket 440 may be disposed between the cover member 450 and the second PCB 420. The bracket 440 may fix the second PCB 420 on which the rear camera module 212 and the third microphone module 430 are disposed. The first seating portion 442 on which the rear camera module 212 is seated and the second seating portion 443 on which the second PCB 420 is disposed may be formed in the bracket 440. In FIG. 4, the first seating portion 442 and the second seating portion 443 may be formed on the surface of the bracket 440 facing the second PCB 420 (e.g., surface facing in +Z direction in FIG. 4). The rear camera module 212 disposed on the first seating portion 442 and the second PCB 420 disposed on the second seating portion 443 may be fixed to the bracket 440. For example, the adhesive member 470 (e.g., double-sided tape, or bond) may be disposed between the rear camera module 212 and the first seating portion 442 and between the second PCB 420 and the second seating portion 443, so that the rear camera module 212 and the second PCB 420 can be adhered and fixed to the bracket 440.

The sound channel 441 may be formed in the bracket 440 at a position facing the first sound hole 421 of the second PCB 420. The sound channel 441 formed in the bracket 440 may connect the first sound hole 421 and the second sound hole 451. For example, an external sound of the electronic device 400 may be transmitted via the second sound hole 451, the sound channel 441, the first sound hole 421, and the microphone hole 431 in this order to the third microphone module 430.

The soundproof member 480 may be disposed around the bracket 440. In FIG. 5, the soundproof member 480 may be disposed between the second PCB 420 and the bracket 440 to seal between the first sound hole 421 and the sound channel 441. The soundproof member 480 may be adhered to the second PCB 420 and the bracket 440 through the adhesive member 470 (e.g., double-sided tape or bond). In addition, the soundproof member 480 may be disposed between the cover member 450 and the bracket 440 to seal between the second sound hole 451 and the sound channel 441. The soundproof member 480 may be adhered to the cover member 450 and the bracket 440 through the adhesive member 470.

The soundproof member 480 may be made of various materials, such as rubber or urethane. The soundproof member 480 may be manufactured in various materials and shapes.

Alternatively, the bracket 440 may be not disposed between the cover member 450 and the second PCB 420. In this case, the soundproof member 480 may be disposed between the second PCB 420 and the cover member 450 so as to seal between the first sound hole 421 and the second sound hole 451. The above-described sound channel 441 indicates a channel formed by the soundproof member 480 sealing between the first sound hole 421 and the second sound hole 451 other than the channel formed in the bracket 440.

The first PCB 410 and the second PCB 420 may be disposed to be spaced apart inside the electronic device 400. In FIG. 5, the second PCB 420 may be disposed to be spaced apart from the first PCB 410 in the first direction.

The first PCB 410 may be not sufficiently spaced apart from the second PCB 420. Hence, interference may occur between the first PCB 410 and the third microphone module 430 disposed on the first surface of the second PCB 420. As shown in FIG. 5, an opening 411 may be formed in the first PCB 410 at a position corresponding to the third microphone module 430 disposed on the first surface of the second PCB 420. The opening 411 may be formed to have a size sufficient to accommodate the third microphone module 430. As a result, interference may be prevented between the first PCB 410 and the third microphone module 430.

Alternatively, the first PCB 410 may be sufficiently spaced apart from the second PCB 420. Hence, the first PCB 410 may not experience interference in relation to the third microphone module 430.

The first PCB 410 and the second PCB 420 may be electrically connected. For example, the connection member 460 made of a conductive material may be disposed between the first PCB 410 and the second PCB 420, so that the first PCB 410 and the second PCB 420 may be electrically connected.

In FIG. 5, one surface of the connection member 460 facing the first PCB 410 (e.g., +Z direction) may be connected to the first PCB 410 through soldering. The other surface of the connection member 460 facing the second PCB 420 (e.g., −Z direction) comes into contact with pad portions 422 formed on the first surface of the second PCB 420, so that the first PCB 410 and the second PCB 420 may be electrically connected. One surface of the connecting member 460 may be connected to the first PCB 410 and the other surface of the connecting member 460 may be connected to the second PCB 420 in various manners, so that the first PCB 410 and the second PCB 420 may be electrically connected.

As shown in FIG. 5, a plurality of connection members 460 may be disposed at different positions with respect to the third microphone module 430 between the first PCB 410 and the second PCB 420. The connection member 460 may support the second PCB 420 in the first direction with respect to the first PCB 410. As the connection member 460 supports the second PCB 420 in the first direction, the soundproof member 480 may be compressed to be in close contact between the second PCB 420 and the cover member 450. Consequently, the sealing effect involving the second sound hole 451, the sound channel 441, the first sound hole 421, up to the microphone hole 431 can be improved through the soundproof member 480.

In the above description, the sealing structure where the third microphone module 430 is disposed on the first surface of the second PCB 420 has been described. However, the third microphone module 430 may have a different arrangement. For example, the third microphone module 430 may be disposed on the second surface (e.g., surface facing in −Z direction) of the second PCB 420 opposite to the first surface. In the third microphone module 430, the microphone hole 431 for receiving an external sound may be formed in a direction toward the cover member 450 (e.g., −Z direction). Hence, an external sound of the electronic device 400 may be transmitted via the second sound hole 451, the sound channel 441, and the microphone hole 431 to the third microphone module 430.

Figure 7A:
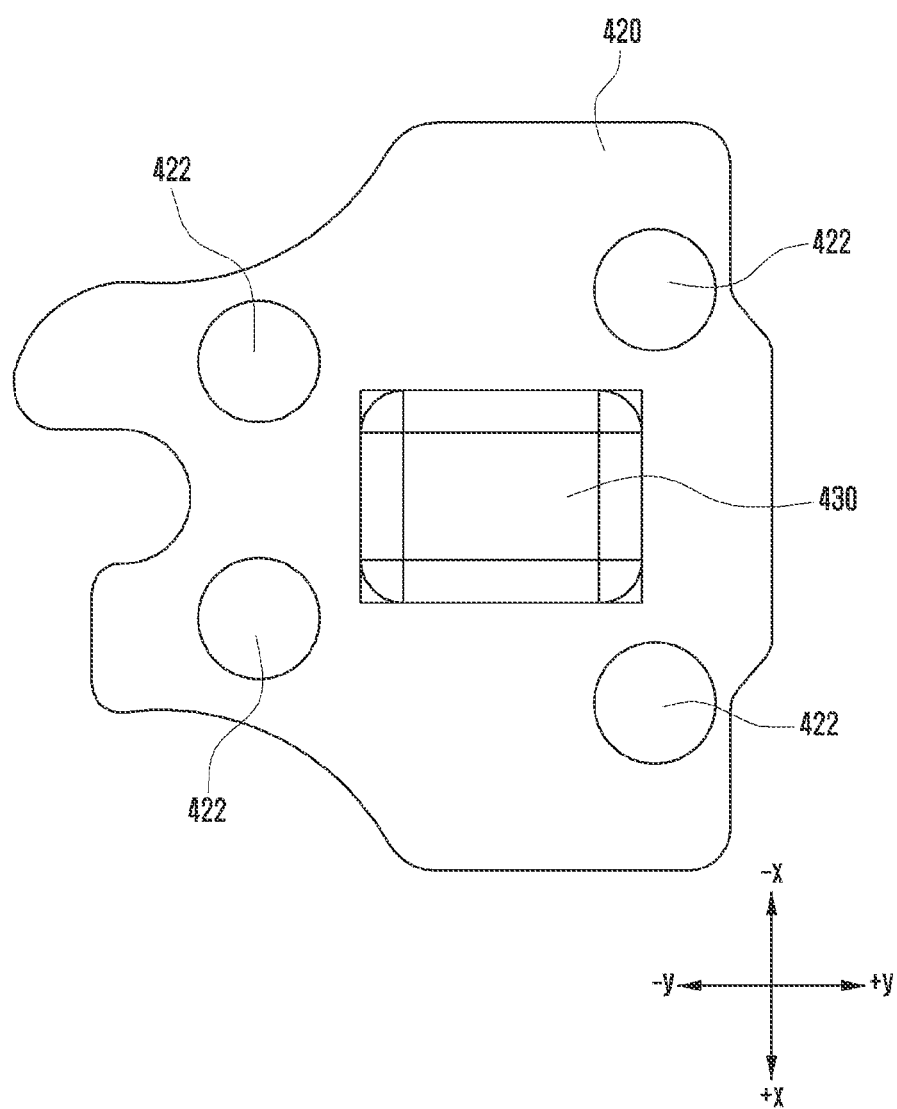
FIG. 7A is a plan view of a second PCB on which a third microphone module is disposed according to an embodiment.
Figure 7B:
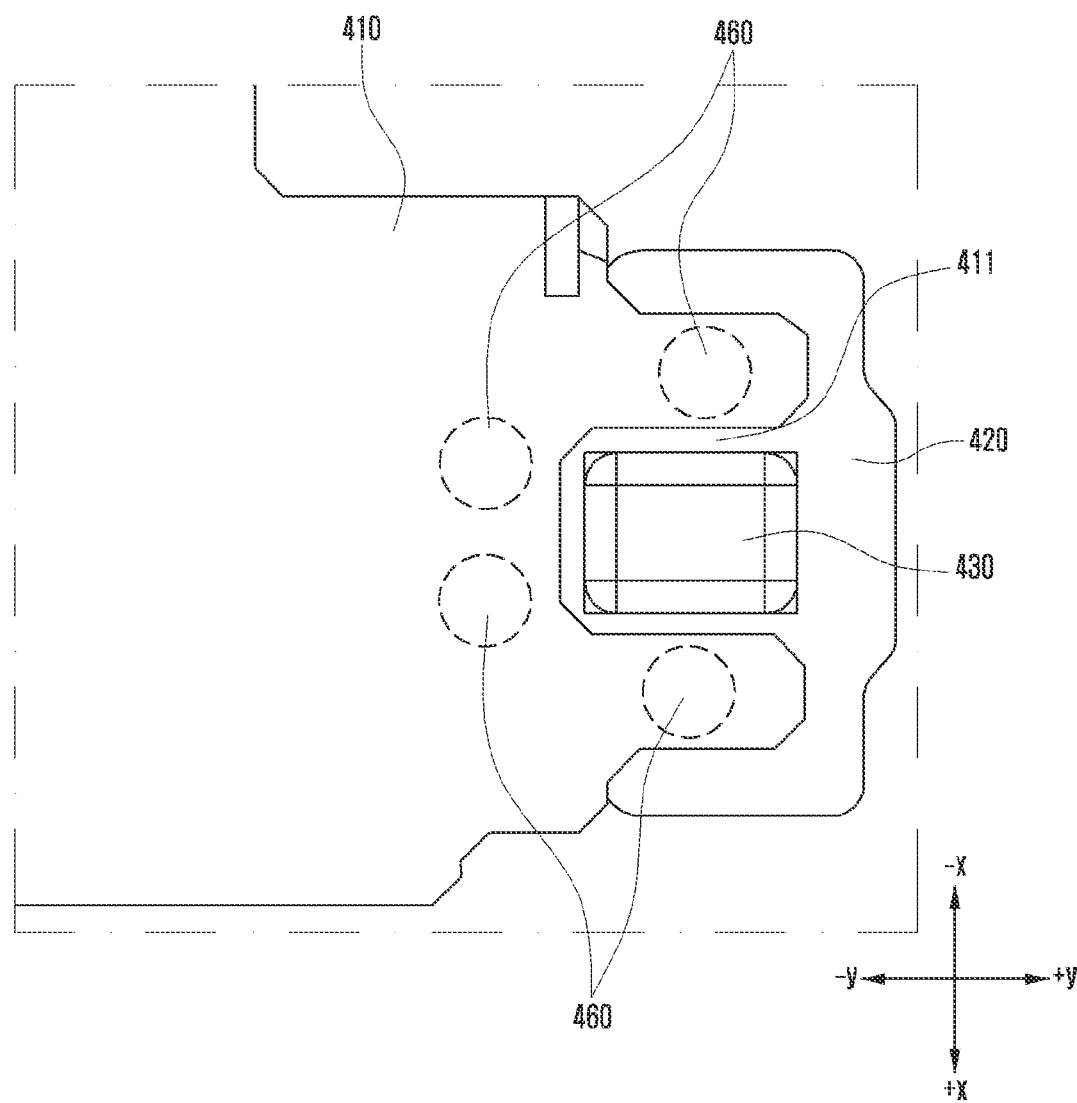
FIG. 7B is a plan view of when a first PCB and a second PCB are electrically connected through a connection member according to an embodiment.

FIG. 7A is a plan view of a second PCB on which a third microphone module is disposed according to an embodiment. FIG. 7B is a plan view of when a first PCB and a second PCB are electrically connected through a connection member according to an embodiment.

As shown in FIG. 7A, pad portions 422 may be formed on the first surface (e.g., surface facing in +Z direction) of the second PCB 420. The pad portion 422 may refer to a portion where the connection member 460 is in contact with the second PCB 420. As the connection member 460 comes into contact with the pad portions 422, the first PCB 410 and the second PCB 420 may be electrically connected. The pad portions 422 may be formed on the first surface of the second PCB 420 in correspondence to the number of the connection members 460.

A plurality of pad portions 422 may be formed on the second PCB 420. For example, additional pad portions 422 to the number of pad portions 422 shown in FIG. 7A may be formed. The pad portions 422 may be connected to the first PCB 410 through the connection member 460, and may transmit a signal of the third microphone module 430 to the first PCB 410 or may transmit a signal generated from the first PCB 410 to the third microphone module 430. The pad portions 422 may transmit signals between the third microphone module 430 and the first PCB 410.

At least one of the pad portions 422 may be a ground having a relatively lower potential than its surroundings. For example, at least one of the pad portions 422 may be electrically connected to the first PCB 410 through the connection member 460. Charges accumulated around the first PCB 410 and the second PCB 420 may be induced to the pad portion 422 serving as a ground having a relatively low potential. At least one of the pad portions 422 may absorb surrounding charges to prevent charge accumulation. Hence, an electrostatic discharge (ESD) phenomenon that may occur around the first PCB 410 and the second PCB 420 may be alleviated or eliminated.

At least one of the pad portions 422 may be electrically connected to other electronic components disposed inside the electronic device 400 other than the third microphone module 430.

The connection members 460 may be disposed at various positions between the first PCB 410 and the second PCB 420.

In FIG. 7B, the first PCB 410 may be formed with a portion removed to open into the opening 411. In this case, the connection members 460 may be arranged to surround some of the side surface of the third microphone module 430 disposed in the opening 411. For example, as shown in FIG. 7B, the connection members 460 may be disposed in a −Y direction, a +X direction, and a −X direction with respect to the third microphone module 430 in FIG. 7B.

Figure 7C:
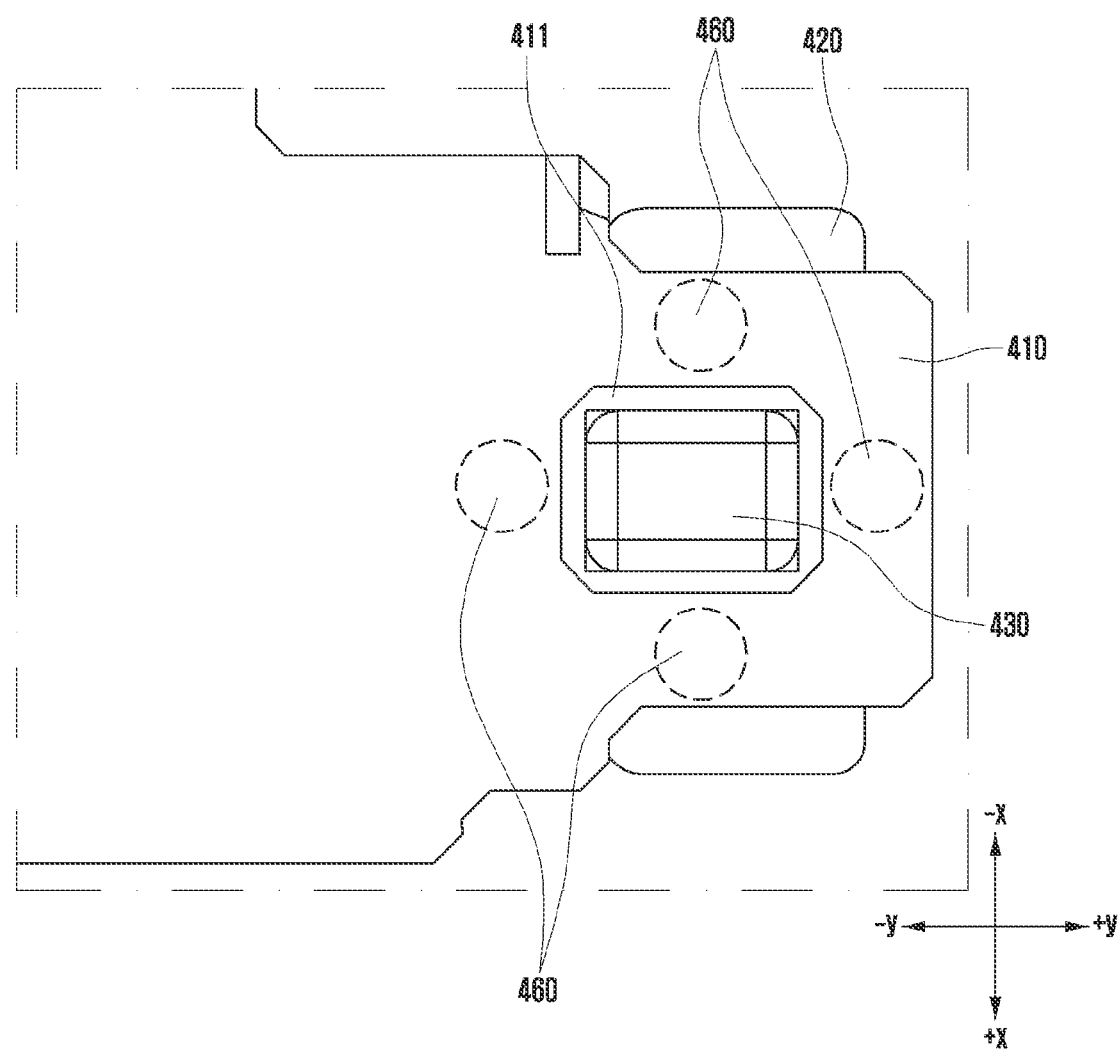
FIG. 7C is a plan view of when a first PCB and a second PCB are electrically connected through a connection member according to an embodiment.

FIG. 7C is a plan view of when a first PCB and a second PCB are electrically connected through a connection member according to an embodiment. In FIG. 7C, the first PCB 410 may be formed to surround the third microphone module 430 disposed in the opening 411. In this case, the connection members 460 may be disposed to surround the side surface of the third microphone module 430 disposed in the opening 411. For example, as shown in FIG. 7C, the connection members 460 may be disposed in a −X direction, a +X direction, a −Y direction, and a +Y direction with respect to the third microphone module 430 in FIG. 7C.

A plurality of connection members 460 may be disposed between the first PCB 410 and the second PCB 420 to surround the third microphone module 430. The number of connection members 460 may be greater than or less than the number of connection members 460 shown in FIG. 7B or FIG. 7C.

The connection members 460 may be arranged between the first PCB 410 and the second PCB 420 and may be disposed at different positions with respect to the third microphone module 430. The connection members 460 may be arranged to be symmetrical in the Y-axis direction with respect to the third microphone module 430 as shown in FIG. 7A. As shown in FIG. 7B and FIG. 7C, the connection members 460 may be arranged to surround the third microphone module 430. As the connection members 460 support the perimeter of the third microphone module 430, the load applied to the second PCB 420 by the third microphone module 430 may be distributed.

Through the connection members 460, the second PCB 420 can be stably supported in the first direction (e.g., in Z direction in FIG. 4 or 5) with respect to the first PCB 410. Consequently, as the connection members 460 support the second PCB 420 in the first direction, the soundproof member 480 may be compressed between the cover member 450 and the second PCB 420, and it can be in close contact between the second sound hole 451 and the sound channel 441 and between the sound channel 441 and the first sound hole 421. In the electronic device 400, the sealing effect involving the second sound hole 451, the sound channel 441, the first sound hole 421, up to the microphone hole 431 can be improved through the soundproof member 480.

The number and positions of connection members 460 with respect to the third microphone module 430 described above are examples, and are not limited to the positions shown in the drawings. As described herein, the number of connection members 460 may be greater than or less than the number of connection members 460 illustrated in FIGS. 7B, 8 and 9.

Figure 7D:
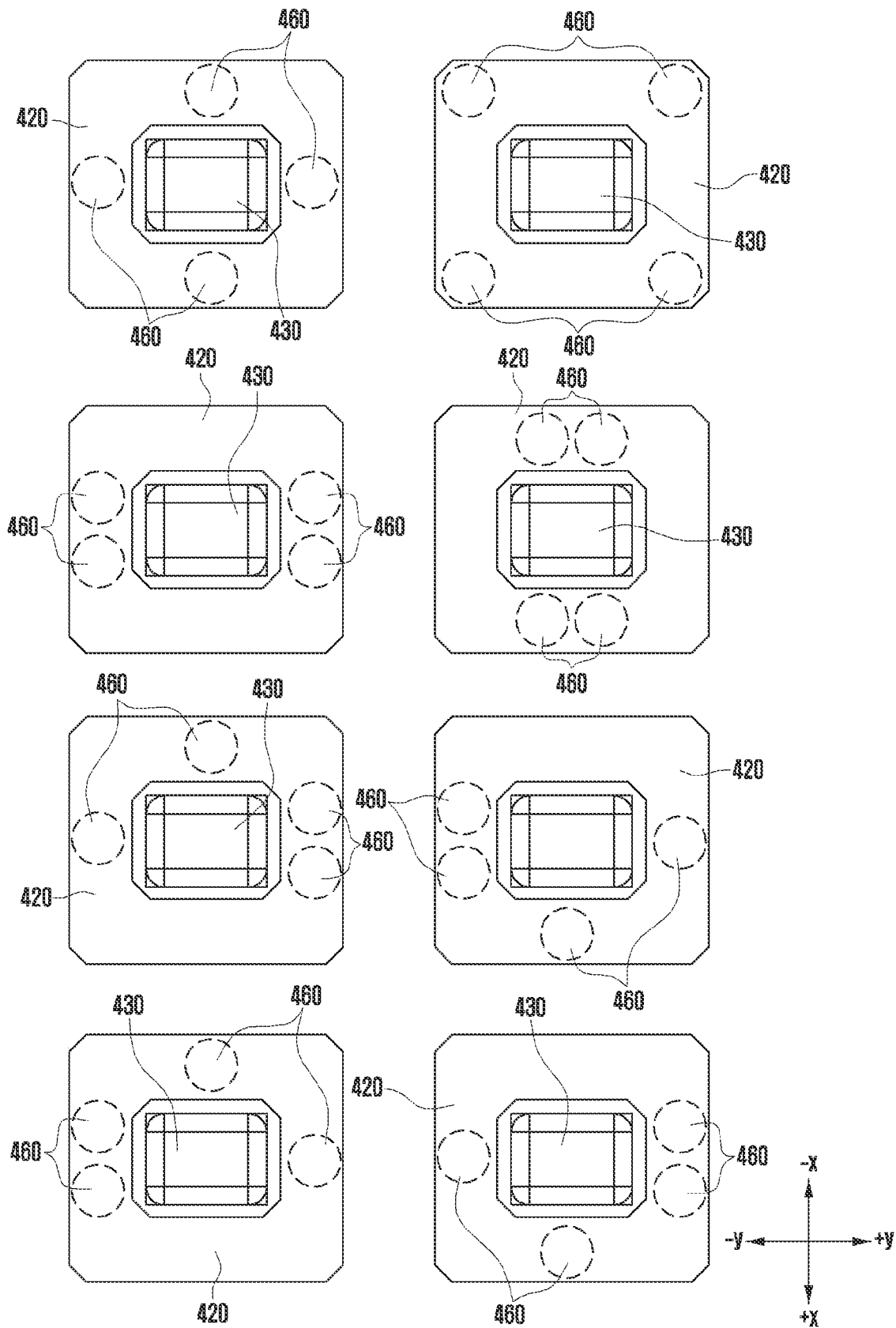
FIG. 7D illustrates various arrangement states of the connection member with respect to the third microphone module disposed on the second PCB according to an embodiment.

FIG. 7D illustrates various arrangement states of the connection member with respect to the third microphone module disposed on the second PCB according to an embodiment. In FIG. 7D, the connection members 460 may be disposed at various positions with respect to the third microphone module 430. However, the present disclosure is not limited thereto. The number and arrangement positions of the connection members 460 may be variously changed as far as the connection members 460 can be disposed at different positions as to the third microphone module 430 and stably support the second PCB 420 in the first direction with respect to the first PCB 410.

Figure 8:
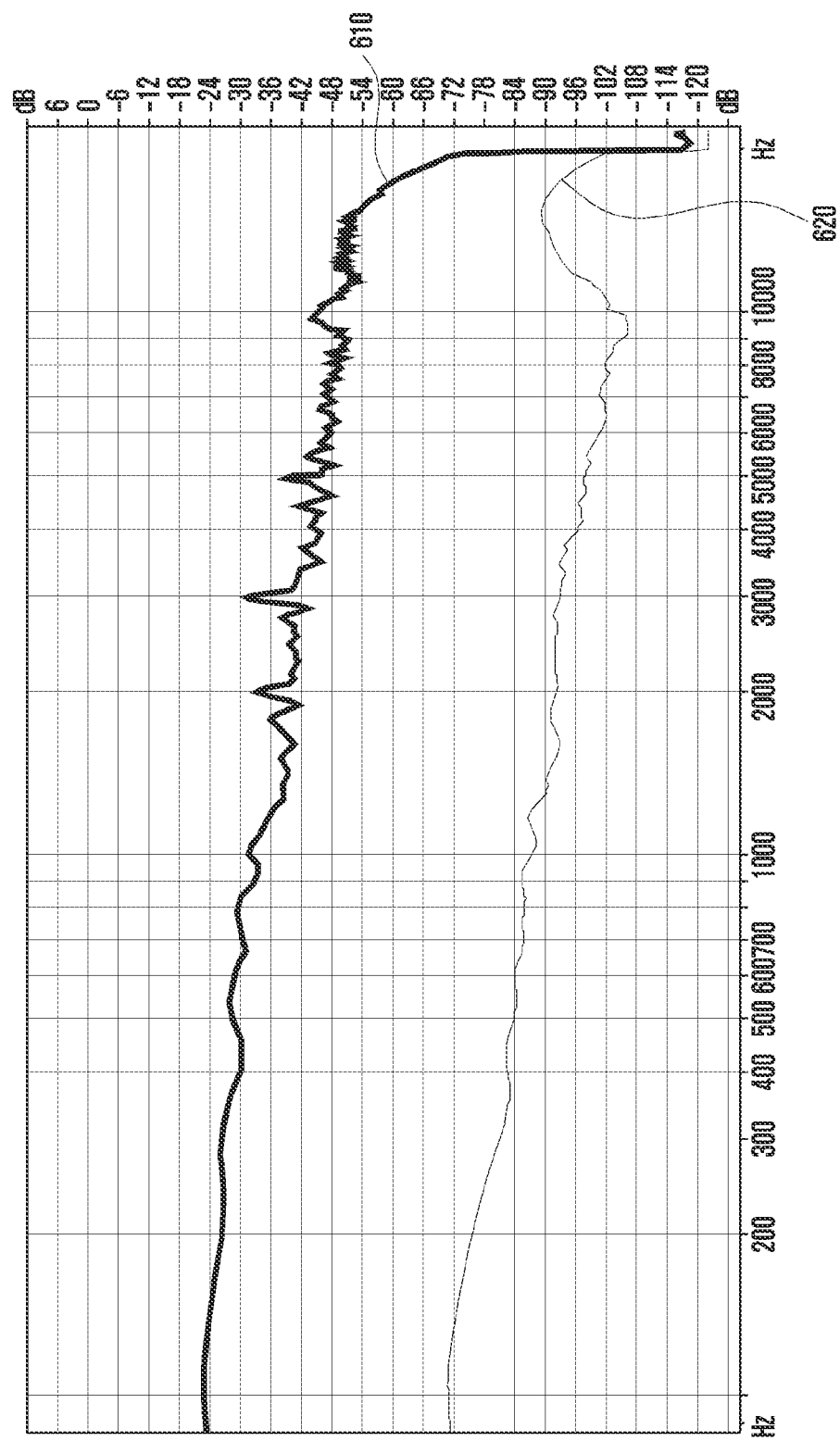
FIG. 8 illustrates a comparison of levels of sound, in decibels (dB), received by the third microphone module based on the presence or absence of a soundproof member, according to an embodiment.

FIG. 8 illustrates a comparison of levels of sound, in decibels (dB), received by the third microphone module based on the presence or absence of a soundproof member, according to an embodiment.

In FIG. 8, a first graph 610 illustrates when sealing involving the second sound hole 451, the sound channel 441, and the first sound hole 421, up to the microphone hole 431 is not achieved. A second graph 620 illustrates when sealing involving the second sound hole 451, the sound channel 441, and the first sound hole 421, up to the microphone hole 431 is achieved by arranging the connection members 460 at different positions with respect to the third microphone module 430. It can be seen that the level of sound received by the third microphone module 430 in the second graph 620 is less than that in the first graph 610, for the following reasons.

In the first graph 610, as sealing involving the second sound hole 451, the sound channel 441, and the first sound hole 421, up to the microphone hole 431 is not achieved, not only a sound collected in the second sound hole 451 but also a sound generated in other parts can be transmitted to the third microphone module 430. Hence, a greater amount of sound than a reference value may be transmitted, and noise such as an echo may be generated. However, in the second graph 620, as sealing involving the second sound hole 451, the sound channel 441, and the first sound hole 421, up to the microphone hole 431 is achieved, only a sound collected in the second sound hole 451 can be transmitted to the third microphone module 430 and a sound generated in other parts may be not transmitted. Hence, since the level of sound received by the third microphone module 430 is less compared with the case of the first graph 610, a noise phenomenon such as an echo can be improved.

Herein, the connection members 460 may be disposed at different positions with respect to the third microphone module 430 between the first PCB 410 and the second PCB 420. For example, the connection members 460 may surround the third microphone module 430 or may be disposed at positions opposite to each other with respect to the third microphone module 430. Hence, the connection members 460 may support the second PCB 420 in the first direction (e.g., −Z direction) with respect to the first PCB 410.

Consequently, the soundproof member 480 may be in close contact between the cover member 450 and the bracket 440 and between the bracket 440 and the second PCB 420. Accordingly, as the sealing effect is improved compared to the conventional art, the noise phenomenon that may occur in the third microphone module 430 may also be improved.

As described above, an electronic device may include a first PCB, a second PCB that is disposed to be spaced apart in a first direction from the first PCB and includes a first sound hole, a microphone module that is disposed on a first surface of the second PCB facing the first PCB so that a microphone hole for receiving an external sound is connected to the first sound hole, a plurality of connection members that are disposed between the first PCB and the second PCB to electrically connect the first PCB and the second PCB and are arranged at different positions with respect to the microphone module, a cover member that includes a second sound hole, which is formed to be connected to the first sound hole and to open into the outside of the electronic device, and is disposed in the first direction with respect to the second PCB, and a sound channel that is located between the cover member and the second PCB to connect the first sound hole and the second sound hole.

The connection members may be arranged in a second direction perpendicular to the first direction and in a third direction opposite to the second direction with respect to the microphone module.

The first PCB may include an opening that is formed at a position corresponding to the microphone module to accommodate the microphone module, and the connection members may be disposed to surround the opening between the first PCB and the second PCB.

The connection members may be made of a conductive material.

The electronic device may further include a soundproof member that is disposed between the first sound hole and the second sound hole so as to seal between the first sound hole and the second sound hole, and the sound channel may be a space formed by the soundproof member sealing between the first sound hole and the second sound hole.

The electronic device may further include a camera module electrically connected to at least one of the first PCB or the second PCB.

The electronic device may further include a bracket that is disposed to cover the camera module and the second PCB to fix the camera module and the second PCB.

The sound channel may be formed in the bracket to connect the first sound hole and the second sound hole.

The cover member may include a camera housing that is disposed in the first direction with respect to the camera module and has the second sound hole formed therein, and the camera housing may include a body part, and a window member that is coupled to the body part and includes a light-transmitting region at least in part.

The second sound hole may include an external hole that is formed in the window member to be connected to the outside of the electronic device, and a channel that is formed in the body part so as to connect the external hole and the first sound hole.

A microphone structure according to various embodiments may include a microphone module, in a second PCB that is disposed to be spaced apart in a first direction from a first PCB of an electronic device, the microphone module being disposed on a first surface (e.g., surface facing in +Z direction) of the second PCB facing the first PCB, a plurality of connection members that are disposed between the first PCB and the second PCB to electrically connect the first PCB and the second PCB and are arranged at different positions with respect to the microphone module, a first sound hole that is formed in the second PCB to be connected to a microphone hole of the microphone module, a second sound hole that is formed to be connected to the first sound hole in a cover member disposed in the first direction with respect to the second PCB, and to open into the outside of the electronic device, and a sound channel that is located between the cover member and the second PCB to connect the first sound hole and the second sound hole.

The connection members may be arranged in a second direction perpendicular to the first direction and in a third direction opposite to the second direction with respect to the microphone module.

The first PCB may include an opening that is formed at a position corresponding to the microphone module to accommodate the microphone module, and the connection members may be disposed to surround the opening between the first PCB and the second PCB.

The connection members may be made of a conductive material.

The microphone structure may further include a soundproof member 480 that is disposed between the first sound hole and the second sound hole so as to seal between the first sound hole and the second sound hole, and the sound channel may be a space formed by the soundproof member sealing between the first sound hole and the second sound hole.

The microphone structure may further include a camera module electrically connected to at least one of the first PCB or the second PCB.

The microphone structure may further include a bracket 440 that is disposed to cover the camera module and the second PCB to fix the camera module and the second PCB.

The sound channel may be formed in the bracket to connect the first sound hole and the second sound hole.

The cover member may include a camera housing that is disposed in the first direction with respect to the camera module and has the second sound hole formed therein, and the camera housing may include a body part, and a window member that is coupled to the body part and includes a light-transmitting region at least in part.

The second sound hole may include an external hole that is formed in the window member to be connected to the outside of the electronic device, and a channel that is formed in the body part so as to connect the external hole and the first sound hole.

While the present disclosure has been described with reference to various embodiments, various changes may be made without departing from the spirit and the scope of the present disclosure, which is defined, not by the detailed description and embodiments, but by the appended claims and their equivalents.

What is claimed is:
1. An electronic device comprising:
a first printed circuit board (PCB);
a second PCB that is disposed to be spaced apart in a first direction from the first PCB and includes a first sound hole;
a microphone module that is disposed on a first surface of the second PCB facing the first PCB so as to connect a microphone hole and receive an external sound through the first sound hole;
a plurality of connection members that are disposed between the first PCB and the second PCB to electri- cally connect the first PCB and the second PCB and are arranged at different positions with respect to the microphone module;
a cover member that includes a second sound hole, which is formed to be connected to the first sound hole and to open into an outside of the electronic device, and is disposed in the first direction with respect to the second PCB; and
a sound channel that is located between the cover member and the second PCB, the sound channel being configured to connect the first sound hole and the second sound hole.

2. The electronic device of claim 1,
wherein the connection members are arranged in a second direction perpendicular to the first direction and in a third direction opposite to the second direction with respect to the microphone module.

3. The electronic device of claim 1,
wherein the first PCB includes an opening that is formed at a position corresponding to the microphone module to accommodate the microphone module, and
wherein the connection members are disposed to surround the opening between the first PCB and the second PCB.

4. The electronic device of claim 1,
wherein the connection members are made of a conductive material.

5. The electronic device of claim 1, further comprising a soundproof member that is disposed between the first sound hole and the second sound hole so as to seal between the first sound hole and the second sound hole,
wherein the sound channel is a space formed by the soundproof member sealing between the first sound hole and the second sound hole.

6. The electronic device of claim 1, further comprising a camera module electrically connected to at least one of the first PCB or the second PCB.

7. The electronic device of claim 6, further comprising a bracket that is disposed to cover the camera module and the second PCB to fix the camera module and the second PCB.

8. The electronic device of claim 7,
wherein the sound channel is formed in the bracket to connect the first sound hole and the second sound hole.

9. The electronic device of claim 6,
wherein the cover member includes a camera housing that is disposed in the first direction with respect to the camera module, the cover member having the second sound hole formed therein, and
wherein the camera housing includes a body part and a window member coupled to the body part and at least partly including a light-transmitting region.

10. The electronic device of claim 9,
wherein the second sound hole includes an external hole that is formed in the window member to be connected to the outside of the electronic device, and a channel that is formed in the body part so as to connect the external hole and the first sound hole.

11. A microphone structure comprising:
a microphone module in a second printed circuit board (PCB) that is disposed to be spaced apart in a first direction from a first PCB of an electronic device, the microphone module being disposed on a first surface of the second PCB facing the first PCB;
a plurality of connection members that are disposed between the first PCB and the second PCB to electrically connect the first PCB and the second PCB and are arranged at different positions with respect to the microphone module;
a first sound hole that is formed in the second PCB to be connected to a microphone hole of the microphone module;
a second sound hole that is formed to be connected to the first sound hole in a cover member disposed in the first direction with respect to the second PCB, and to open into an outside of the electronic device; and
a sound channel that is located between the cover member and the second PCB, the sound channel being configured to connect the first sound hole and the second sound hole.

12. The microphone structure of claim 11,
wherein the connection members are arranged in a second direction perpendicular to the first direction and in a third direction opposite to the second direction with respect to the microphone module.

13. The microphone structure of claim 11,
wherein the first PCB includes an opening that is formed at a position corresponding to the microphone module to accommodate the microphone module, and
wherein the connection members are disposed to surround the opening between the first PCB and the second PCB.

14. The microphone structure of claim 11,
wherein the connection members are made of a conductive material.

15. The microphone structure of claim 11, further comprising a soundproof member that is disposed between the first sound hole and the second sound hole so as to seal between the first sound hole and the second sound hole,
wherein the sound channel is a space formed by the soundproof member sealing between the first sound hole and the second sound hole.

16. The microphone structure of claim 11, further comprising a camera module electrically connected to at least one of the first PCB or the second PCB.

17. The microphone structure of claim 16, further comprising a bracket that is disposed to cover the camera module and the second PCB to fix the camera module and the second PCB.

18. The microphone structure of claim 17,
wherein the sound channel is formed in the bracket to connect the first sound hole and the second sound hole.

19. The microphone structure of claim 16,
wherein the cover member includes a camera housing that is disposed in the first direction with respect to the camera module, the cover member having the second sound hole formed therein, and
wherein the camera housing includes a body part, and a window member coupled to the body part and at least partly including a light-transmitting region.

20. The microphone structure of claim 19,
wherein the second sound hole includes an external hole that is formed in the window member to be connected to the outside of the electronic device, and a channel that is formed in the body part so as to connect the external hole and the first sound hole.

* * * * *